United States Patent [19]

Cather, Jr.

[11] 4,218,813
[45] Aug. 26, 1980

[54] METHOD AND TOOL FOR INSTALLING SHAFTS THROUGH SEALS

[75] Inventor: Douglas A. Cather, Jr., Gastonia, N.C.

[73] Assignee: Garlock Inc., Longview, Tex.

[21] Appl. No.: 8,061

[22] Filed: Jan. 31, 1979

[51] Int. Cl.² .................. B23P 11/02; B23P 19/02
[52] U.S. Cl. ........................... 29/450; 29/464; 29/235; 277/1; 277/10; 277/11
[58] Field of Search .......... 29/464, 235, 450; 277/1, 10, 11

[56] References Cited
U.S. PATENT DOCUMENTS

| | | | |
|---|---|---|---|
| 3,110,095 | 11/1963 | Peickie | 29/464 X |
| 3,233,313 | 2/1966 | Roth | 29/235 |
| 3,327,379 | 6/1967 | Clements | 29/235 X |
| 3,538,587 | 11/1970 | Shurtleff et al. | 29/235 |
| 3,604,096 | 9/1971 | Shiroma | 29/235 |
| 3,947,944 | 4/1976 | Washington | 277/1 X |
| 4,081,218 | 3/1978 | Gabriel | 29/235 X |
| 4,114,897 | 9/1978 | Bainard | 277/1 |

*Primary Examiner*—Charlie T. Moon
*Attorney, Agent, or Firm*—Schovee & Boston

[57] ABSTRACT

An installation tool 10 and method for preventing damage to the lip or lips 34 and 35 of a shaft seal 12 mounted in a bore 16 of a housing 18 during installation of a shaft 20 through the bore and seal, the tool including a handle 26, an annular body 22 and a lip protective sleeve 24. The body and sleeve have a split 27 therethrough to allow for circumferential expansion thereof such that it can be removed radially off of the shaft 20.

25 Claims, 9 Drawing Figures

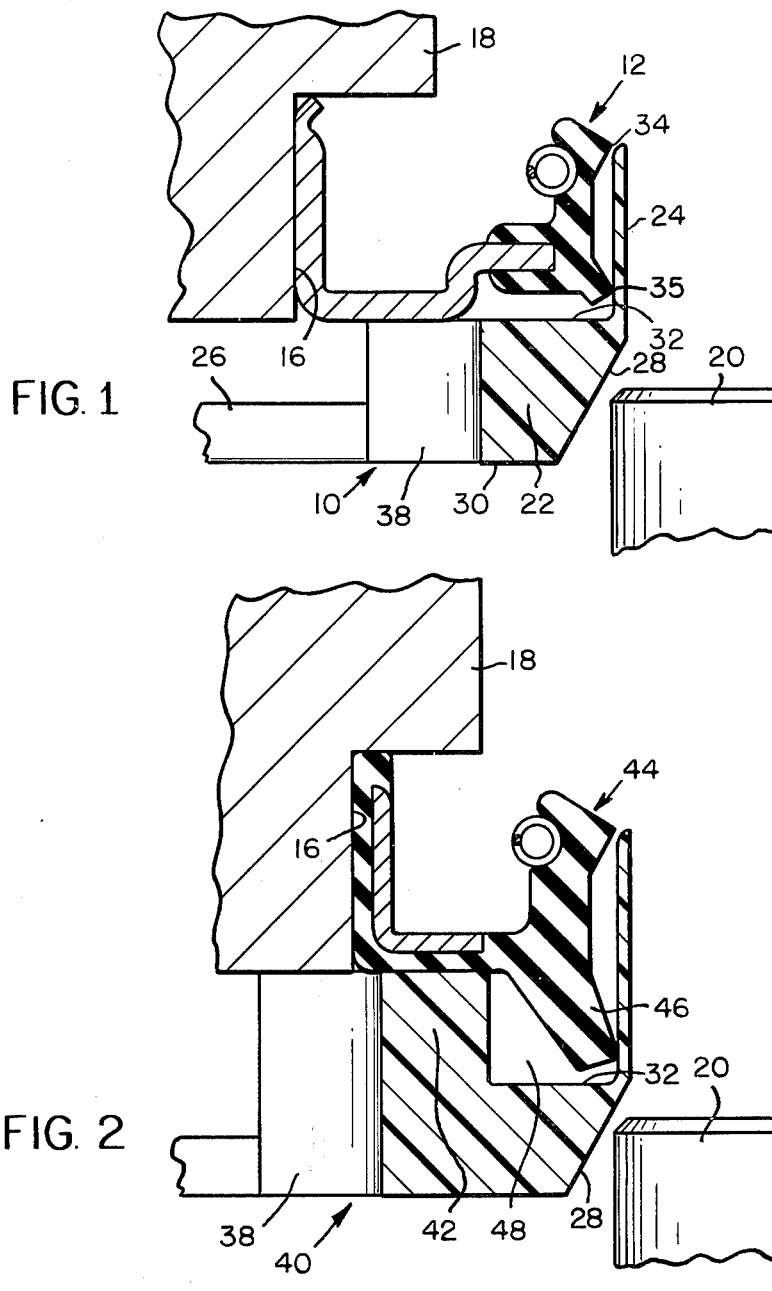

METHOD AND TOOL FOR INSTALLING SHAFTS THROUGH SEALS

TECHNICAL FIELD

This invention relates to seals and in particular to a tool and method for preventing damage to the lip or lips of a seal mounted in a bore of a housing during installation of a shaft through the housing bore and seal.

BACKGROUND OF THE PRIOR ART

It is often necessary to install a shaft through a housing bore having a shaft seal already mounted therein, the seal having one or more sealing lips designed to sealingly contact the shaft after installation thereof through the housing bore and seal. During shaft installation, the seal lip or lips can be damaged such as by being cut or distorted. Further, if the seal includes a lip extending in the direction opposing the direction of shaft installation, such opposing lip can be inverted. In addition, a garter spring, if present, can be damaged or dislocated from the spring groove. Contributing factors to such seal and/or spring damage are: (1) insufficient chamfer or radius on the lead-in edge of the shaft; (2) misallignment of the shaft; (3) high degree of interference between the seal lip and the shaft; (4) opposing cold-formed polytetrafluoroethylene lip or polytetrafluoroethylene-lined lip; (5) the lip element being weakly supported; (6) the shaft having a spline, keyway, tapped hole, etc.

One solution to this problem in the prior art is the use of a metal or plastic cylindrical sleeve that has an I.D. larger than the O.D. of the shaft. This sleeve is inserted into the seal and then the shaft is installed and the sleeve protects the seal lips. The sleeve is then pulled axially out of the seal and removed off of the outer end of the shaft. However, such a sleeve can not be used in all situations, such as when there is another machine element (either on the shaft or positioned very close to the housing) located such as to prevent the sleeve from sliding off of the outer end of the shaft.

It is an object of the present invention to provide a tool and method for preventing damage to the lip or lips of a seal mounted in a bore of a housing during installation of a shaft through the housing bore.

It is another object of this invention to provide such a tool and method that can be used in all situations including those in which the above-described prior art system can not be used.

It is a further object of this invention to provide such a tool and method wherein the tool's protective sleeve can be moved axially out of the seal and then radially off of and away from the shaft.

It is another object of the invention to provide such a tool and method wherein the protective sleeve can be easily inserted into the seal without expanding the seal lips and wherein such expansion is done by the shaft during shaft installation.

BRIEF SUMMARY OF THE INVENTION

The installation tool includes: (1) an annular body having a shaft lead-in surface on the axially outer radial surface thereof, (2) a lip protection sleeve connected to the body at the I.D. thereof and extending axially inwardly therefrom, and (3) a handle connected to the annular body for manipulating the tool.

The annular body and sleeve are split axially to allow for circumferential expansion and retraction thereof so that the body and sleeve can be removed radially away from the shaft. The body preferably has a flex notch opposite the split to aid the circumferential expansion.

The sleeve is inserted axially into a seal prior to shaft installation, the shaft is then axially forced through the bore, seal, and sleeve. The O.D. of the sleeve when inserted into the seal is preferably smaller than the seal I.D. to make insertion of the sleeve easier. Installation of the shaft into the seal and sleeve then causes the sleeve and the sealing lip or lips to expand. After the shaft is installed, the tool is moved axially outwardly until the sleeve has been withdrawn from the axially outermost of the sealing lips, and then the tool is removed radially from the shaft, by circumferential expansion of the body and sleeve as allowed by the split.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIGS. 1 and 3 are each partial cross-sectional views through a tool according to one embodiment of the present invention, with the tool shown inserted into a seal prior to installation of a shaft into the seal;

FIG. 2 is a partial cross-sectional view similar to FIGS. 1 and 3 but through a tool according to another embodiment of the present invention;

DETAILED DESCRIPTION OF INVENTION

Figure 3:
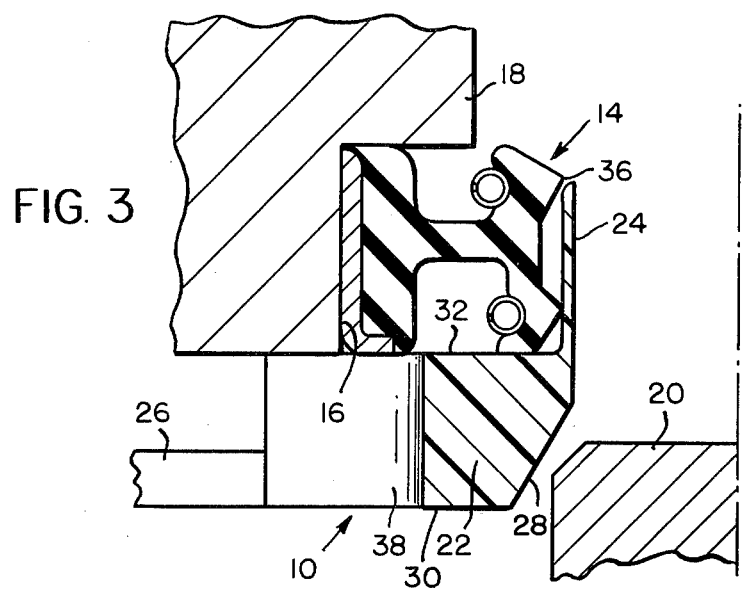
Figure 4:
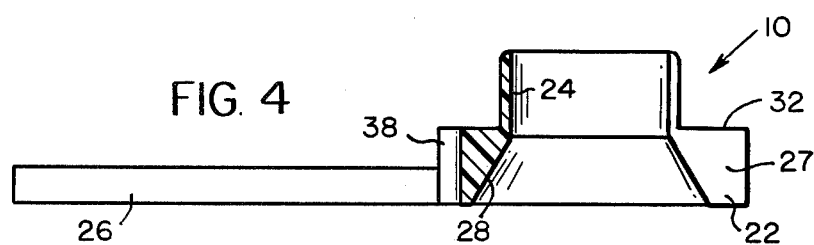
FIG. 4 is another cross-sectional view through the tool of FIGS. 1 and 3.

Referring now to the drawings, FIGS. 1, 3, 4, 5, and 6 show a tool 10 according to a preferred embodiment of the present invention. FIGS. 1 and 3 show the tool 10 used with different types of shaft seals 12 and 14, respectively, each mounted in a bore 16 of a housing 18. The seals 12 and 14 are mounted in the housing 18 prior to the installation of a shaft 20 through the bore 16, and it is the purpose of the tool 10 to prevent damage to the lips of shaft seals previously mounted in the housing. The seal 12, for example, has two lips including a primary lip 34 and an auxiliary or dust lip 35.

Figure 5:
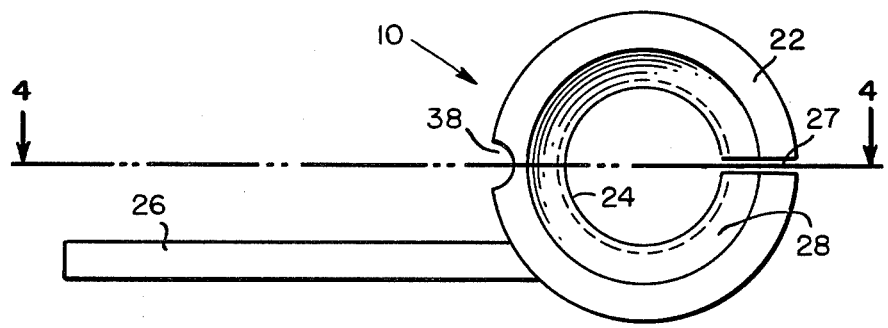
FIG. 5 is a view from the bottom of the tool of FIG. 4.

The tool 10 includes an annular body 22, a lip protection sleeve 24 and a handle 26. The body 22 and sleeve 24 are split-apart at at least one circumferential position or side thereof by means of an elongated slit 27 (FIG. 5). The annular body 22 includes a tapered shaft lead-in surface 28 on a radially inner portion of an axially outer radial surface 30. The lead-in surface 28 tapers both radially and axially inwardly. The body 22 also includes an axially inner radial surface 32 adapted to contact either the housing 18 or the seal, depending on the size of the seal. In FIG. 1, the surface 32 contacts the seal 12 and in FIG. 3 it contacts the seal 14 and the housing 18. In FIGS. 1-3, the axially inward direction is up and the axially outward direction is down, as will be understood by those skilled in the art.

The sleeve 24 is connected to the body 22 adjacent an inside diameter portion thereof and extends axially inwardly therefrom. The length of the sleeve is preferably such that the distal end thereof terminates just short of the axially innermost seal lip, such as lip 34 in FIG. 1 and a lip 36 in FIG. 3. The reason for this is that if the sleeve extended past the lip 34 or 36 it could, when axially withdrawn, cause the lip 34 or 36 to become inverted.

The handle 26 is connected to the annular body 22 and extends radially therefrom for use in manipulating the tool, either manually or automatically. The handle 26 can be connected by screws, rivets, or by any other desired means.

The body 22 and sleeve 24 are preferably made of plastic such as nylon and the handle is preferably metal. The body 22 and sleeve 24 are preferably one unitary, integral piece made such as by machining or injection molding. The slit 27 is preferably molded in place, although it can be cut after molding. The body and sleeve can be made of other materials such as a synthetic elastomer. The body and sleeve are preferably flexible, elastic or resilient or all three. The lead-in surface 28 is preferably at an angle of about 30° to the axis of the shaft.

Figure 6:
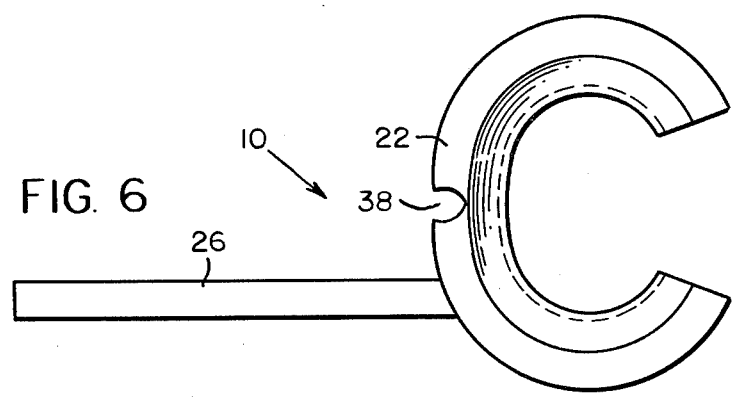
FIG. 6 is a plan view of the tool of FIGS. 1, 3, 4, 5 shown expanded for removal from a shaft.

As shown in FIG. 5, the annular body 22 can have a flex notch 38 opposite the slit 27 to improve the expandability of the body 22 to the position shown in FIG. 6 for radial movement from the shaft 20.

In operation, the tool is manipulated so as to insert the sleeve axially into a seal (such as seal 12 or 14). The shaft 20 is then installed axially inwardly through the housing bore 16, the seal (such as seal 12 or 14), and the tool 10. As the shaft 20 contacts the lead-in surface 28, the shaft and the seal lips become substantially concentrically oriented with respect to each other. As the shaft enters the lip protection sleeve 24, the body 22 and sleeve 24 expand, stretching the seal lips and allowing passage of the shaft. After the shaft has been completely installed, the handle 26 is used to withdraw the sleeve 24 axially outwardly from the seal lips, and then radially away from the shaft 20 by circumferential expansion of the body 22 and sleeve 24 by virtue of the slit 27 (see FIG. 6).

The slit 27 can be a separation or cut allowing the body and sleeve to be held closed (and to be made circumferentially smaller) to make insertion into the seal easier. Alternatively, the slit and circumferential size of the body and sleeve can be designed such that the body and sleeve insert easily without being held closed. A further alternative is that the tool can have a relatively tight initial fit with the seal, in which case less expansion will be required during installation of the shaft. Thus, the "at rest" or "as molded" O.D. of the sleeve can be either larger or smaller than the I.D. of the seal, and if larger, the slit can be a separation allowing the sleeve to be contracted down to an O.D. smaller than the I.D. of the seal.

FIG. 2 shows a tool 40 according to another embodiment of the present invention. The tool 40 is identical to the tool 10 except for the inclusion of a spacer portion 42 extending axially inwardly from the axially inner radial surface 32. The spacer portion 42 is preferably annular although this is not essential. Alternatively, the spacer portion 42 can be a series of separate, circumferentially spaced-apart portions (not shown). This tool 40 is used whenever a seal 44 is involved having an auxiliary lip 46 that extends axially out past the end of the housing 18, so that the tool 40 can abut the housing 18 without contacting the auxiliary lip 46. The tool 40 thus has an auxiliary lip receiving groove 48.

Figure 7:
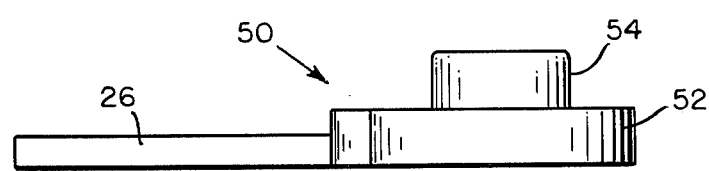
FIG. 7 is a side view of a tool according to another embodiment of the present invention.
Figure 8:
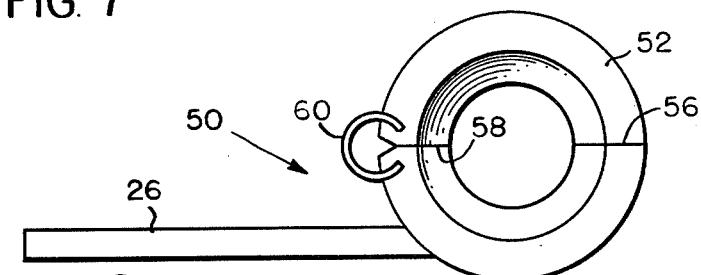
FIG. 8 is a view from the bottom of the tool of FIG. 7.
Figure 9:
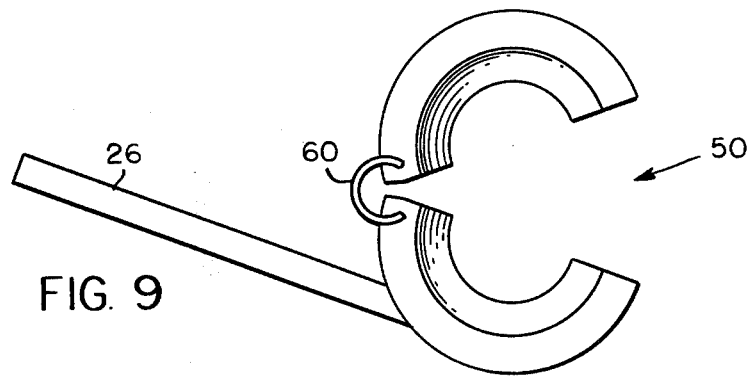
FIG. 9 is a plan view similar to FIG. 8 except that it shows the tool in its expanded condition.

FIGS. 7-9 show a tool 50 according to another embodiment of the invention. The tool 50 is identical to the tool 10 except that it includes a body 52 and a sleeve 54 that can be made of rigid material such as metal. The body 52 and sleeve 54 have a slit 56 to provide for circumferential expansion. The tool 50 also has a second slit 58 and a hinge 60. The hinge 60 is preferably spring biased to a closed position, and can be, for example, a "C" spring hinge. The body 52 and sleeve 54 can have more than one of the slits 58 and corresponding hinges 60, if desired. FIG. 9 shows the tool 50 in its open position.

The tool of the present invention can be used with a wide variety of types of seals in addition to seals 12, 14, and 44 shown here. The tool has particular advantages in cases where the seal has an outwardly directed lip that could be inverted during installation of the shaft and in cases where the shaft has splines. The tool is primarily useful in situations such as those in which a second machine member (not shown) is located closely adjacent to the housing 18 such that the tool 10, for example, can not be removed axially of the axially outer end of the shaft 20. The sleeve is preferably cylindrical although this is not essential. The handle preferably extends directly radially outwardly, however, other configurations can be used. The sleeve is preferably about 0.030 inch thick. The term "split" is hereby defined for use in the present specification and claims to include any type of separation, whether or not the two adjacent surfaces are in contact or spaced-apart, and whether or not the split is made by cutting, slicing, or molding and whether or not it extends parallel to the axis of the sleeve, at an angle, curves, or any combination thereof.

The invention has been described in detail with particular reference to the preferred embodiments thereof, but it will be understood that variations and modifications can be affected within the spirit and scope of the invention as described hereinafter and as defined in the appended claims.

I claim:

1. An installation tool for preventing damage to the lip or lips of a shaft seal mounted in a bore of a housing, during installation of a shaft through the housing bore and seal, said installation tool comprising:
    (a) an annular body having a shaft lead-in surface on at least a radially inner portion of an axially outer radial surface thereof, said lead-in surface tapering both radially and axially inwardly;
    (b) a lip protection sleeve connected to said body adjacent an inside diameter portion thereof and extending axially inwardly therefrom;
    (c) a handle connected to said annular body for use in manipulating said tool; and
    (d) said body and sleeve including at least one continuous axial slit extending completely through at least one peripheral side of said annular body and sleeve along the entire axial length thereof, whereby said body and sleeve are separated at said at least one slit and can expand circumferentially for removal radially off of any shaft extending through said body and sleeve.

2. The tool according to claim 1 wherein said sleeve is cylindrical.

3. The tool according to claim 1 wherein said body and sleeve include means for aiding the circumferential expansion of said annular body and sleeve.

4. The tool according to claim 1 wherein said sleeve is connected to said body adjacent to the inside diameter edge of said lead-in surface.

5. The tool according to claim 1 wherein said lead-in surface is at an angle of about 30° to the axis of said annular body.

6. The tool according to claim 1 wherein said body and sleeve are molded together as one integral, unitary elastomeric member.

7. The tool according to claim 1 wherein said handle is connected to an outside diameter surface of said body and extends radially outwardly therefrom.

8. The tool according to claim 1 wherein said annular body includes a spacer portion extending axially inwardly from an axially inner radial surface thereof, said spacer portion being spaced-apart radially outwardly from said sleeve whereby an annular groove is provided between said portion and said sleeve to receive an axially outwardly extending sealing lip of a seal mounted in a bore of a housing which said spacer portion is adapted to contact.

9. The tool according to claim 8 wherein said spacer portion is an annular portion and is an integral unitary part of said annular body.

10. The tool according to claim 1 wherein said body and sleeve are made at least partially of flexible material such that said body and sleeve can expand and retract circumferentially.

11. The tool according to claim 1 wherein said body and sleeve are made at least partially of resilient material such that said body and sleeve can expand and retract circumferentially.

12. The tool according to claim 1 wherein said body and sleeve are made at least partially of elastic material such that said body and sleeve can expand and retract circumferentially.

13. The tool according to claim 1 wherein said body and sleeve include at least one additional slit and including at least one hinge connecting adjacent portions of said body and sleeve at said at least one additional slit for allowing expansion of said body and sleeve.

14. The tool according to claim 13 wherein said body and sleeve are made of rigid material.

15. The tool according to claim 13 wherein said hinge includes a spring biasing said body and sleeve to a closed position.

16. The tool according to claim 15 wherein said body and sleeve are made of rigid material.

17. A method for preventing damage to the lip or lips of a shaft mounted in a bore of a housing, during installation of a shaft through the housing bore and seal, said method comprising:

(a) providing an installation tool comprising an annular body having a shaft lead-in surface on at least a radially inner portion of an axially outer radial surface thereof, said lead-in surface tapering both radially and axially inwardly; a lip protection sleeve connected to said body adjacent an inside diameter portion thereof and extending axially inwardly therefrom; a handle connected to said annular body for use in manipulating said tool; and said body and sleeve including at least one continuous axial slit extending completely through at least one peripheral side of said annular body and sleeve along the entire axial length thereof, whereby said body and sleeve are separated at said at least one slit and can expand circumferentially for removal radially off of any shaft extending through said body and sleeve;

(b) inserting said sleeve of said tool axially inwardly into said seal;

(c) inserting a shaft axially inwardly through said seal and sleeve;

(d) moving said tool axially outwardly at least until all of said sleeve is located axially outwardly of the axially outermost lip of said seal; and (e) moving said tool radially away from said shaft by circumferentially expanding said body and sleeve by virtue of said at least one slit to allow such radial removal.

18. The method according to claim 17 wherein said tool moving steps include manually grasping said handle and manipulating said tool by virtue of moving said handle.

19. The method according to claim 17 wherein said sleeve inserting step includes moving said sleeve axially inwardly until said annular body abuts at least one of said seal and said housing.

20. The method according to claim 17 wherein said providing step includes providing an annular groove in an axially inner radial surface of said annular body to accomodate a lip of said seal extending axially outwardly beyond an outer surface of said housing.

21. The method according to claim 17 wherein said annular body and sleeve are made of rigid material and including the step of hingedly connecting separate portions of said annular body and sleeve and spring biasing said separate portions toward a closed position.

22. The method according to claim 17 including the step of providing said sleeve with an at rest O.D. smaller than the I.D. of said seal such that said sleeve is easily inserted axially inwardly into said seal.

23. The method according to claim 17 including the step of providing said sleeve with an at rest O.D. larger than the I.D. of said seal, and including the step of circumferentially compressing said sleeve to a smaller O.D. than the I.D. of said seal prior to said step of inserting said sleeve axially inwardly into said seal.

24. The method according to claim 23 including expanding said sleeve by said shaft inserting step.

25. The method according to claim 17 including the step of providing said sleeve with an O.D. larger than the I.D. of said seal and forcing said sleeve into said seal.

* * * * *

UNITED STATES PATENT AND TRADEMARK OFFICE
CERTIFICATE OF CORRECTION

PATENT NO. : 4,218,813
DATED : August 26, 1980
INVENTOR(S) : Douglas A. Cather

It is certified that error appears in the above-identified patent and that said Letters Patent are hereby corrected as shown below:

Claim 17, line 2, after "shaft" insert --seal--.

Signed and Sealed this

Eleventh Day of November 1980

[SEAL]

Attest:

SIDNEY A. DIAMOND

Attesting Officer    Commissioner of Patents and Trademarks